United States Patent [19]
Chang

[11] Patent Number: 5,566,485
[45] Date of Patent: Oct. 22, 1996

[54] CAR-USED DISTRESS SIGN

[76] Inventor: Shin-Shui Chang, No.5, Lane 85, Tung-Yang Rd., Feng-Yuan City, Taichung Hsien, Taiwan

[21] Appl. No.: 562,621

[22] Filed: Nov. 24, 1995

[51] Int. Cl.[6] .................................................. G09F 21/04
[52] U.S. Cl. ............................ 40/591; 362/80.1; 340/472
[58] Field of Search ................................... 362/80.1, 239; 40/591; 340/472, 479

[56] References Cited

U.S. PATENT DOCUMENTS

| | | | |
|---|---|---|---|
| 4,825,191 | 4/1989 | Ching-Hwei | 340/472 |
| 5,041,813 | 8/1991 | Chang | 340/472 |
| 5,126,926 | 6/1992 | Chiang Wen | 362/80.1 X |
| 5,311,412 | 5/1994 | Yang | 340/472 X |
| 5,438,780 | 8/1995 | Winner | 40/591 X |

*Primary Examiner*—Joanne Silbermann
*Attorney, Agent, or Firm*—Browdy and Neimark

[57] ABSTRACT

A car-used distress sign which is normally in a horizontally linear pattern and can be immediately changed into a triangular pattern by the driver in case the car breaks down without getting out of the car. The distress sign includes a base, a left warning member, a central warning member and a right warning member. The base is disposed with two pivot seats at two ends. A latch hook and a first resilient member are pivotally connected with each pivot seat. Two electromagnetic pulling members are disposed on the base. The latch hooks are connected with the pulling members by driving strings. The left and right warning members are disposed with latch pins for engaging with the latch hooks. A second resilient member is disposed on the central warning member and two pairs of third resilient members are disposed at two ends of the base. Two pushing blocks are disposed at two ends of the second resilient member to pivotally connect with the left and right warning members respectively. The electromagnetic pulling members are able to pull the driving strings inward so as to disengage the latch hooks from the latch pins. At this time, the second resilient member pushes the pushing blocks as well as the left and right warning members outward. Meanwhile, the third resilient members pivotally push the left and right warning members, so that the left and right warning members together with the central warning member form a triangular distress sign.

1 Claim, 4 Drawing Sheets

CAR-USED DISTRESS SIGN

BACKGROUND OF THE INVENTION

The present invention relates to a car-used distress sign which is normally disposed on a rear side of the car in a horizontally linear pattern to serve as a third brake light. In case the car breaks down, the distress sign can be immediately changed into a triangular pattern by the driver without getting out of the car so as to inform the rearward car of the distress and ensure safety.

A conventional car-used distress sign is placed behind the car by the driver after the car breaks down. In case the car breaks down on a high way, it is extremely dangerous for the driver to get out of the car and locate the distress sign by reason that it is difficult for a driver of a rearward car to see the situation and stop the car in time. Therefore, it often takes place that the rearward car collides the forward broken down car.

Therefore, it is necessary to provide a car-used distress sign which in case the car breaks down, can be immediately formed into a triangular pattern by the driver without getting out of the car so as to inform the rearward car of the distress in time and ensure safety.

SUMMARY OF THE INVENTION

It is therefore a primary object of the present invention to provide a car-used distress sign which can be immediately changed into a triangular pattern by the driver inside the car without getting out of the car so as to ensure safety.

According to the above object, the car-used distress sign is normally disposed on a rear side of the car in a horizontally linear pattern to serve as a third brake light. The distress sign includes a base, a left warning member, a central warning member and a right warning member. The base is formed with a receptacle having a driving channel. Two ends of the driving channel are disposed with two pivot seats. A latch hook and a first resilient member are pivotally connected with each pivot seat. Two electromagnetic pulling members are disposed on a central portion of the base. The latch hooks are connected with the pulling members by driving strings. The left and right warning members are disposed with latch pins for engaging with the latch hooks. A second resilient member is disposed on the central warning member and two pairs of third resilient members are disposed at two ends of the base. Two pushing blocks are disposed at two ends of the second resilient member to pivotally connect with the left and right warning members respectively. The electromagnetic pulling members are able to pull the driving strings inward so as to disengage the latch hooks from the latch pins. At this time, the second resilient member pushes the pushing blocks as well as the left and right warning members outward. Meanwhile, the third resilient members pivotally push the left and right warning members, so that the left and right warning members together with the central warning member form a triangular distress sign.

The present invention can be best understood through the following description and accompanying drawings, wherein:

DETAILED DESCRIPTION OF THE PREFERRED EMBODIMENT

Figure 1:
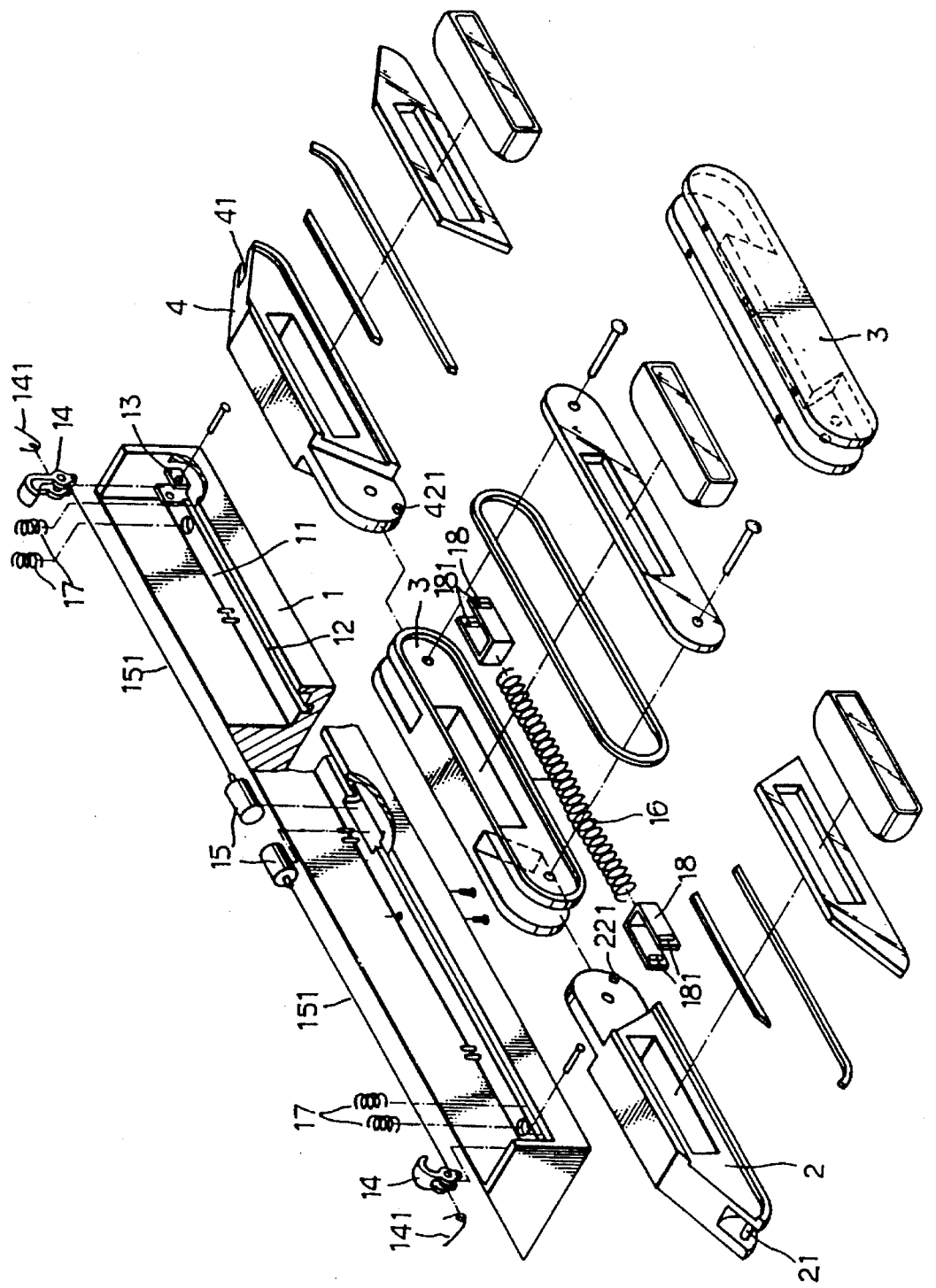
FIG. 1 is a perspective exploded view of the present invention.

Please refer to FIG. 1. The present invention includes a base 1, a left warning member 2, a central warning member 3 and a right warning member 4.

The base 1 is formed with a receptacle 11 and a driving channel 12 is formed on a bottom wall of the receptacle 11. Two pivot seats 13 are disposed on two ends of the driving channel 12. A latch hook 14 and a first resilient member 141 are pivotally connected with each pivot seat 13. Two electromagnetic pulling members 15 are disposed at a central portion of the driving channel 12. The latch hooks 14 are connected with the pulling members 15 by driving strings 151. The left and right warning members 2, 4 are disposed with latch pins 21, 41, whereby when the pulling members 15 are not activated, the first resilient member 141 is extended to engage the latch hooks 14 with the latch pins 21, 41. At this time, the left and right warning members 2, 4 are horizontally located on the base 1 to serve as a third brake light. A second resilient member 16 is disposed on lower side of the central warning member 3. Two pairs of third resilient members 17 are disposed at two ends of the base 1 under the left and right warning members 2, 4. Two U-shaped pushing blocks 18 are disposed at two ends of the second resilient member 16 to clamp projections 22, 42 of the left and right warning members 2, 4 respectively. The projections 22, 42 of the left and right warning members 2, 4 are disposed with two bosses 221, 421 respectively and the pushing blocks 18 are formed with slide grooves 181 corresponding to the bosses 221, 421, whereby the pushing blocks 18 are pivotally connected with the left and right warning members 2, 4.

Figure 2:
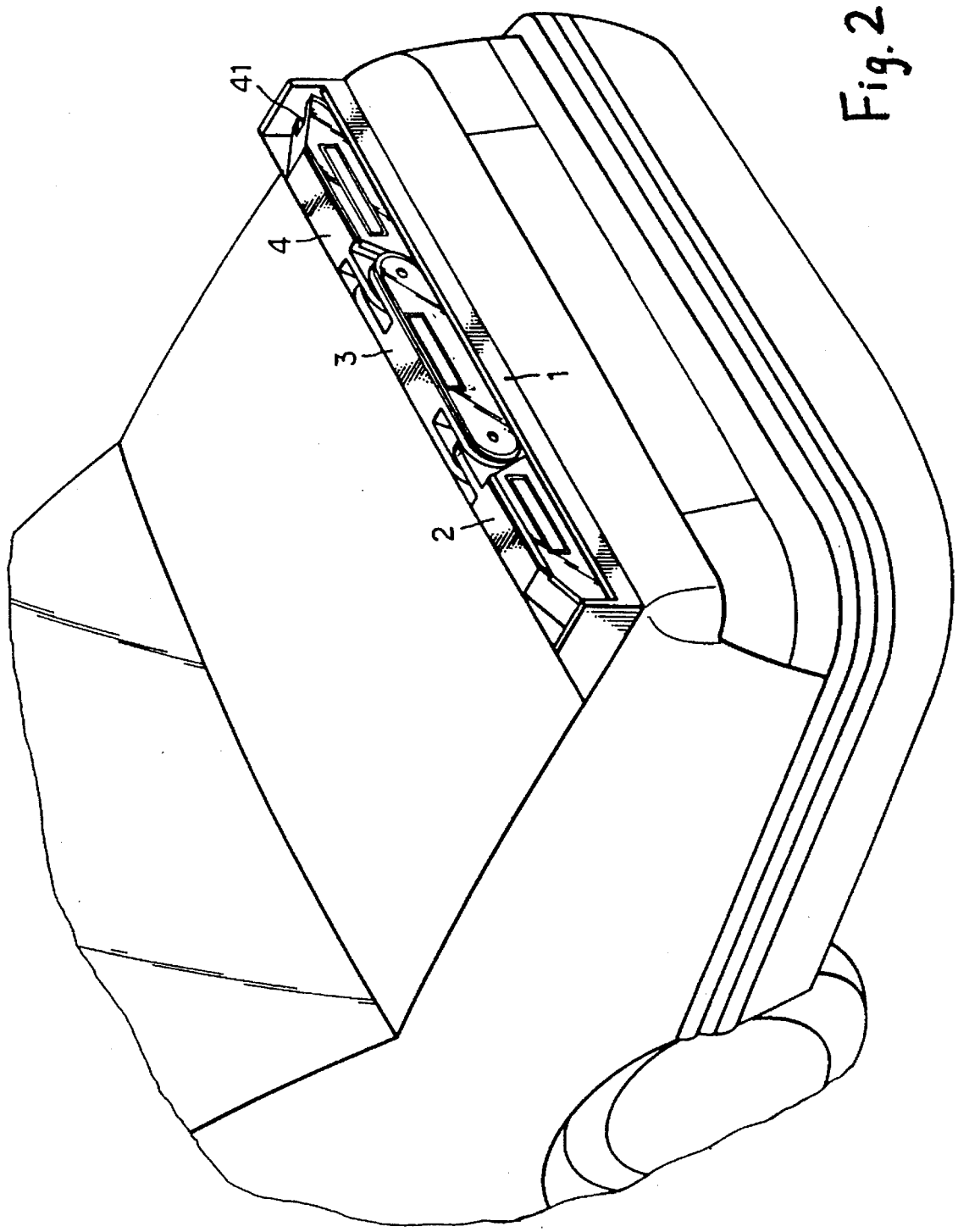
FIG. 2 shows that the distress sign of the present invention is normally disposed on a rear side of the car in a horizontal linear pattern.

Referring to FIG. 2, the electromagnetic pulling members 15 are powered on by the battery of a car and is controlled by a button in the car or a distress light of the car.

Figure 3:
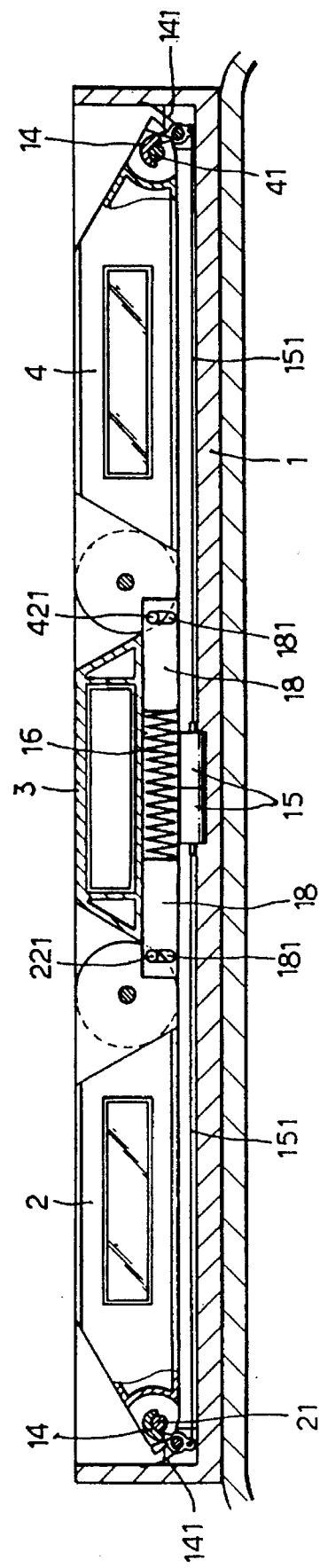
FIG. 3 is a sectional view of the distress sign in a horizontal straight pattern.

In normal state, that is, the button is not depressed or the distress light is not turned on, the electromagnetic pulling members 15 are not activated and the latch hooks 14 are engaged with the latch pins 21, 41 of the left and right warning members 2, 4 by means of the extension force of the first resilient members 141. At this time, the left and right warning members 2, 4 and the central warning member 3 are arranged into a horizontally linear pattern on the base 1 to serve as the third brake light as Shown in FIG. 3.

Figure 4:
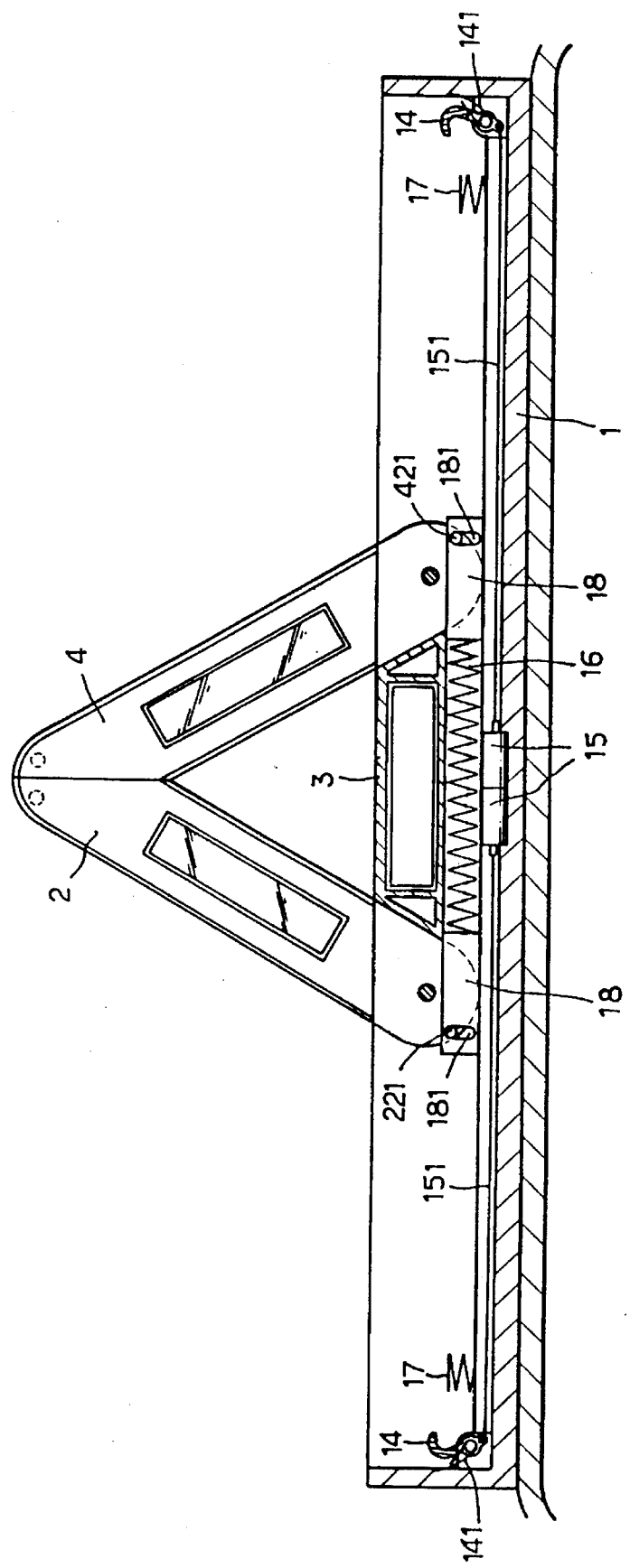
FIG. 4 is a sectional view of the distress sign in a triangular pattern.

In case the car breaks down and the distress light is turned on or the button is depressed, the electromagnetic pulling members 15 are powered on and activated so as to pull the driving strings 151 inward. Accordingly, the latch hooks 14 are pivoted and disengaged from the latch pins 21, 41 of the left and right warning members 2, 4. At this time, the second resilient member 16 pushes the pushing blocks 18 outward. By means of the bosses 221, 421 of the left and right warning members 2, 4 in the slide grooves 181 of the pushing blocks 18, the left and right warning members 2, 4 are pivotally pushed outward. Meanwhile, the third resilient members 17 pivotally push the left and right warning members 2, 4 upward, so that the left and right warning members 2, 4 are moved upward toward each other to together with the central warning member 3 form a triangular distress sign as shown in FIG. 4.

In conclusion, the pattern of the distress sign of the present invention can be changed by means of the button in the car or the warning light of the car. Therefore, in case the car breaks down, the driver can immediately change the distress sign into the triangular pattern without getting out of the car so as to inform the rearward car of the distress and avoid possible collision.

The above embodiment is only an example of the present invention and the scope of the present invention should not be limited to the example. Any modification or variation derived from the example should fall within the scope of the present invention.

What is claimed is:

1. A car-used distress sign comprising a base, a left warning member, a central warning member and a right warning member, said distress sign being characterized in that:

the base is formed with a receptacle and a driving channel is formed on a bottom wall of the receptacle, two pivot seats being disposed on two ends of the driving channel, a latch hook and a first resilient member being pivotally connected with each pivot seat, two electromagnetic pulling members being disposed at a central portion of the driving channel, the latch hooks being connected with the pulling members by driving strings, the left and right warning members being disposed with latch pins, whereby when the pulling members are not activated, the first resilient member is extended to engage the latch hooks with the latch pins and the left and right warning members are horizontally located on the base to serve as a third brake light, a second resilient member being disposed on lower side of the central warning member, two pairs of third resilient members being disposed at two ends of the base under the left and right warning members, two U-shaped pushing blocks being disposed at two ends of the second resilient member to clamp projections of the left and right warning members respectively, the projections of the left and right warning members being disposed with two bosses respectively and the pushing blocks being formed with slide grooves corresponding to the bosses, whereby the pushing blocks are pivotally connected with the left and right warning members.

* * * * *